Patented Feb. 16, 1943

2,311,316

UNITED STATES PATENT OFFICE 2,311,316

PROCESS FOR PREPARING VEGETABLE JUICES

John G. Souther, Alameda, Calif., assignor to The Schwarz Engineering Company, Inc., San Francisco, Calif., a corporation of Nevada No Drawing. Application August 2, 1940, Serial No. 350,093

22 Claims. (Cl. 99—155)

This invention relates to the avoidance of the unsightly appearance of vegetable juices, which become unsightly due to coagulation therein of constituents thereof on subjecting such juices to heat for the purpose of cooking or sterilizing them, or for any other desired or required purpose. It is particularly appliable in the packaging of vegetable juices mechanically extracted from raw vegetables and which normally have a pH of at least about 4.5. Although the term is not an exact one, such juices are known in the industry as non-acid vegetable juice, and such a designation will be adhered to in this description and the appended claims. Carrots, celery, red beets, etc., yield such juices. Such juices are in demand, not only on account of their flavor, but also on account of their high contents of vitamins and other nutritional values.

The various juices are packaged in suitable containers such for example, as waterproof cartons, glass jars, cans, and the like. Packaging of the juices of raw vegetables without sterilizing them is dangerous if the packaged goods are allowed to stand at room temperature, since fermentation and spoilage can occur and particularly over the long period of time that the packaged foodstuffs are sometimes stored.

The principles involved in the invention are the same regardless of the type of container used; but the invention will be described with particular reference to canning because it is a generally used type of packaging. A step generally required in the canning and other packaging of vegetable juices and liquids for human consumption is that of sterilization by the application of heat to insure the destruction of such micro-organisms as may be present which are the cause of fermentation and spoilage.

The sterilizing heat treatment generally required by the laws or regulations in force in most localities, when applied to the juices extracted from the raw vegetables above referred to has the great disadvantage that it causes coagulation of material forming a part of such juices, which destroys the smooth texture and the pleasing appearance of the juice, and the coagulated solids settle rapidly. The coagulated material is not harmful, but on the contrary, it contains essential food values; and about the only reason for avoiding its presence is that the loss of smooth texture and the rapid settlement of the coagulated solids are objected to by many consumers, some consumers even suspecting that the product is not of highest grade or is spoiled. They have therefore refused to purchase or to drink such prior canned vegetable juices.

The appearance of such heat-sterilized juices can be improved by removing the coagulated material by filtration or clarification; but this has the disadvantage that food values, such as flavoring and nutritional values, are thereby removed from the juices, including carrotene which is the source of vitamin A, one of the most valuable elements of carrots.

Raw carrot juice undergoes two coagulations on being gradually heated up, the first at approximately one hundred eighty degrees Fahrenheit (180° F.) and the second at about two hundred ten degrees Fahrenheit (210° F.). The first coagulation, at the lower temperature, forms comparatively large, soft lumps, and the second coagulation, at the higher temperature, forms smaller granular lumps. The granular lumps give a granular texture to the juice, and, in fact, both types of lumps give it an objectionable appearance. The raw juices extracted from celery and red beets, and perhaps other vegetables as well, undergo similar coagulations.

Specifications vary in different jurisdictions as to just how the raw juices must be sterilized for canning; and to meet the requirements and regulations in the State of California at the present time, and perhaps in other States also, it is necessary to heat such juices at two hundred forty degrees Fahrenheit (240° F.) for thirty (30) minutes. It will thus be apparent that coagulation will and must occur during such sterilizing step and, in fact, it occurs in sterilizing such juices in accordance with the regulations in force in many if not all of the States. Sterilization may be avoided if the canned juices are promptly subjected to and maintained at temperatures low enough to inhibit or retard sufficiently the action of any harmful micro-organisms therein until the juices are to be used. But if they are later heated for the purpose of cooking or sterilizing them, the cooking temperature, and of course the sterilizing temperature, will cause the coagulation. With the requirement that the sterilizing heat treatment or cook must be such that coagulation must occur, the only canned juices extracted from raw carrots, celery and red beets, and perhaps other vegetables have either had the above-mentioned unsightly and objectionable appearance, or they have been filtered or clarified in some manner with a consequent loss of food values and involving trouble and expense in the filtration or clarification step.

Objects of this invention are to provide heat-sterilized or heat-treated canned juices extracted from raw vegetables; which do not have the above-mentioned objectionable features; which contain substantially all of the food values of the raw vegetables, which contain substantially all the material normally present in the vegetables with the possible exception of some of the cellulose, which will have the smooth texture and pleasing appearance of freshly extracted raw vegetable juices and maintain it for a long time without noticeable break or separation of the solid and liquid constituents of the juices, which contain the maximum amount of the food values present in the vegetables and at the same time have an attractive and pleasing appearance; to provide juices extracted from raw vegetables which have a pleasing appearance and which do not form lumpy or granular solids on being heated; to provide an easily practiced process for making the products mentioned above; to provide an easily practiced process for mechanically extracting the optimum amounts of food values from raw vegetables as juices and preventing the formation of lumpy or granular solids when such juices are heated, without loss of food value and without making the products unsightly; and other objects will become apparent on reading this specification.

I avoid all of the above-mentioned difficulties and objectionable features by the use of this invention which, generally stated, involves the pre-canning steps of coagulating whatever would otherwise be coagulated during the sterilization by heat, or other heat treatment, and then preventing the coagulated material from making the juices unsightly, and without removal or loss of food values, by homogenizing the juices with the coagulated material therein, the homogenization subdividing or comminuting the coagulum so completely and so finely that the solids will remain suspended in the liquid for a long time. The homogenized mass may then be subjected to conventional canning steps of putting the material into cans, sealing the cans, and heating to assure the destruction of objectionable micro-organisms; or it may be subjected to any other desired canning operations including cooking or sterilization by heat, without producing an unsightly coagulum. By the use of this invention the juices of raw vegetables may be canned in accordance with the law and the official regulations prevailing in any jurisdiction, and the canned product, even after a long interval of time, will have the desired texture and appearance, will contain more food values than prior products, and will be sterile.

Vegetable juices which are canned and without being sterilized are promptly subjected to and maintained at a temperature sufficiently low to inhibit the action of any micro-organisms present, will likewise maintain their good appearance and not coagulate if heated, if they have already been coagulated and homogenized.

In treating the vegetables in accordance with this invention, the usual and desirable sanitary precautions as to cleanliness should obviously be taken. The carrots are usually washed and preferably peeled and the peelings discarded, since the exclusion of the outer skin usually results in the product having a brighter color. Other vegetables may likewise be peeled, or not, as desired. In the case of vegetables the color of the juices of which are not affected by the presence of the outer skins, or if the color be not deemed of sufficient importance as may happen in certain instances, peeling may be omitted.

The vegetables should be very finely comminuted in order to permit of extraction of the maximum amounts of liquid and of food values present therein, even though some of these values be in non-liquid or solid condition. A juice consisting entirely of clear liquid and with no solids therein usually lacks food values naturally present in vegetables since some food values are usually normally present in solid condition in vegetables, and, it is therefore not the best product from a physiological or nutritional point of view. It is my desire to produce the best possible juices from such points of view and to make the products have the most attractive and appetizing appearance.

I therefore prefer to comminute the vegetables very finely, not only to open the maximum number of juice cells and thus liberate the maximum amount of juice, but also to liberate the maximum amount of all food values present and permit their easy separation from the vegetable fiber. With this in view, I prefer to treat the vegetables in a rotary machine which grinds or comminutes them, centrifuges the resulting mixture of comminuted solids and liquids to separate the coarser solids from the liquids; and which recomminutes such coarser solids and centrifuges this recomminuted mass for a similar separation. The series of steps of comminuting and separating may be repeated in the machine as many times as may be found desirable, and the access of sufficient air to do substantial harm to the product is to be prevented. A machine involving these principles of operation is described and claimed in the application of Henry G. Schwarz for Centrifugal extractors, Serial No. 54,795, filed Dec. 17, 1935. The juices resulting from the different centrifuging steps may be combined for further treatment or they may be separately further treated.

Roughly ground vegetables can be pressed in filter cloths to yield juices containing vegetable liquids and solubles, but this leaves solid food values normally present in the vegetables, including the valuable carrotene of carrots and the distinct individual vegetable flavoring materials, with the vegetable fiber. A better product thus results if the vegetables are finely comminuted, especially in a plurality of steps with intervening steps of solid and liquid separation, and with prevention of access of too much air.

After separation of the juices which comprise both liquids and the more finely divided solids, they may be subjected to my novel pre-canning steps of pre-coagulating by preheating, and then homogenizing.

A simple way to cause the pre-coagulation of all of the material otherwise coagulable by the subsequent heating step for cooking or for sterilizing, or for any other purpose is merely to heat the juices or liquids to a sufficiently high temperature to coagulate all the material that would otherwise be coagulated by the subsequent heat treatment. The preheating step should be of such character that all of the material in the vegetable juices coagulable by the prescribed sterilizing heat treatment will be coagulated by the preheating step, whereupon the homogenizing step may follow. Without full knowledge of the characteristics of each individual juice and as a matter of safety, the preheating step might be the same as the sterilizing step, or perhaps at the highest temperature of the sterilizing step. However, it is sufficient and more economical to heat the juices at the highest temperatures below the sterilizing temperature at which any coagulation causable by the sterilizing treatment will be made to occur. This is about two hundred ten degrees Fahrenheit (210° F.) for many kinds of carrots, celery and red beets and it may be easily accomplished in a simple manner merely by boiling the juices at atmospheric sea level pressure.

The duration of the pre-canning coagulating treatment by boiling the juices need usually be of only very short duration because complete coagulation is generally almost instantaneous. The important point is to coagulate substantially all of the material coagulable by the subsequent heat treatment, and, as stated, with many kinds of carrots, celery and red beets, heating to two hundred twelve degrees Fahrenheit (212° F.) accomplishes this. There may perhaps be different types of carrots or of the other vegetables for which a somewhat different specific treatment is advisable; and having once determined just what this treatment is to be, it is an easy matter to apply it to the juice of the particular type of carrots or of other vegetables and thereafter homogenize the juice with the coagulum therein.

Tests show that carrot juice, for example, coagulated at lower temperatures, for example one hundred eighty degrees Fahrenheit (180° F.) and then homogenized, had the same smooth homogeneous texture of the freshly extracted juices, but a further or secondary coagulation was observed to start at approximately two hundred eight degrees Fahrenheit (208° F.) and to be completed on reaching two hundred twelve degrees Fahrenheit (212° F.). Further tests showed that such juices preheated to one hundred ninety degrees Fahrenheit (190° F.) and then homogenized, developed an undesirable grainy texture during sterilization by heating at two hundred forty degrees Fahrenheit (240° F.) for thirty (30) minutes; while such juices heated to boiling temperature at sea level pressure before homogenization still had a smooth and homogeneous appearance after such sterilization.

After properly preheating to the full coagulating temperature and then homogenizing, the subsequent steps of canning including sterilizing by heat may be those conventionally used in the canning industry, and need not be further described. I prefer, but it is not essential, to proceed with the canning operations promptly after homogenizing.

The canned and heat-sterilized juices made according to this invention have a smooth and homogeneous texture and appearance. They are canned, sterilized, and in fact completely prepared products, in accordance with technical and legal requirements, have a smooth and homogeneous texture and appearance, and no change is noticeable on standing for about a half hour or even longer, and they contain practically all of the nutritional and flavoring values of the vegetables. Eventually a slow settling of the solids may be observed but without loss of the smooth texture of the product. The settling is slow, and the appearance becomes homogeneous again on mild stirring or shaking because the settling particles are all very small and light in weight.

Juices mechanically extracted from raw vegetables as described above, promptly canned without any sterilizing treatment, and kept in good condition by subjecting them to, and maintaining them at, temperatures low enough to inhibit or retard sufficiently the action of any micro-organisms present therein, may later be heated without causing them to undergo the above described coagulation and thereby assume the undesirable appearance referred to above, if they have been previously subjected to the novel pre-coagulating and homogenizing steps, as described above.

Mixtures of individual non-acid vegetable juices may be treated in the same manner as the individual ones, and the claims are intended to cover the mixed as well as the individual juices.

This application is a continuation in part of my application Serial No. 272,403 filed May 8, 1939, for Canned carrot juice and process of making it.

I claim:

1. The process of preparing heat-sterilized, packaged, normally non-acid vegetable juice, comprising packaging and heat-sterilizing in the conventional manner, characterized by the preliminary steps of heating to substantially two hundred twelve degrees Fahrenheit (212° F.) and thereafter homogenizing, before subjection to said conventional packaging and heat-sterilizing steps.

2. The process of preparing heat-sterilized, packaged carrot juice, comprising packaging and heat-sterilizing in the conventional manner, characterized by the preliminary steps of heating to substantially two hundred twelve degrees Fahrenheit (212° F.) and thereafter homogenizing, before subjection to said conventional packaging and heat-sterilizing steps.

3. The process of preparing heat-sterilized, packaged celery juice, comprising packaging and heat-sterilizing in the conventional manner, characterized by the preliminary steps of heating to substantially two hundred twelve degrees Fahrenheit (212° F.) and thereafter homogenizing, before subjection to said conventional packaging and heat-sterilizing steps.

4. The process of preparing heat-sterilized, packaged red beet juice, comprising packaging and heat-sterilizing in the conventional manner, characterized by the preliminary steps of heating to substantially two hundred twelve degrees Fahrenheit (212° F.) and thereafter homogenizing, before subjection to said conventional packaging and heat-sterilizing steps.

5. The process of making vegetable juice which will not form soft, large lumps nor granular lumps on being subjected to a subsequent heating step, which comprises comminuting vegetables normally yielding non-acid juice to a very fine degree, separating the fluent from the non-fluent portions, heating the non-fluent portion to coagulate all material therein coagulable by said subsequent heating step, and homogenizing the liquid and the resulting coagulum.

6. The process of making carrot juice which will not form soft, large lumps nor granular lumps on being subjected to a subsequent heating step, which comprises comminuting carrots to a very fine degree, separating the fluent from the non-fluent portions, heating the non-fluent portion to coagulate all material therein coagulable by said subsequent heating step, and homogenizing the liquid and the resulting coagulum.

7. The process of making celery juice which will not form soft, large lumps nor granular lumps on being subjected to a subsequent heating step, which comprises comminuting celery to a very fine degree, separating the fluent from the non-fluent portions, heating the non-fluent portion to coagulate all material therein coagulable by said subsequent heating step, and homogenizing the liquid and the resulting coagulum.

8. The process of making red beet juice which will not form soft, large lumps nor granular lumps on being subjected to a subsequent heating step, which comprises comminuting celery to a very fine degree, separating the fluent from the non-fluent portions, heating the non-fluent portion to coagulate all material therein coagulable by said subsequent heating step, and homogenizing the liquid and the resulting coagulum.

9. The process of making packaged vegetable juice which will not form soft, large lumps nor granular lumps on being heated which comprises comminuting vegetables normally yielding non-acid juice to a very fine degree, separating the fluent from the non-fluent portions by centrifuging, heating the fluent portion to about two hundred twelve degrees Fahrenheit (212° F.) to coagulate heat-coagulable material therein, homogenizing the liquid containing the resulting coagulum, and subjecting the homogenized mass to a packaging operation.

10. The process of making packaged carrot juice which will not form soft, large lumps nor granular lumps on being heated, which comprises comminuting carrots to a very fine degree, separating the fluent from the non-fluent portions by centrifuging, heating the fluent portion to about two hundred twelve degrees Fahrenheit (212° F.) to coagulate heat-coagulable material therein, homogenizing the liquid containing the resulting coagulum, and subjecting the homogenized mass to a packaging operation.

11. The process of making packaged celery juice which will not form soft, large lumps nor granular lumps on being heated, which comprises comminuting celery to a very fine degree, separating the fluent from the non-fluent portions by centrifuging, heating the fluent portion to about two hundred twelve degrees Fahrenheit (212° F.) to coagulate heat-coagulable material therein, homogenizing the liquid containing the resulting coagulum, and subjecting the homogenized mass to a packaging operation.

12. The process of making packaged red beet juice which will not form soft, large lumps nor granular lumps on being heated, which comprises comminuting red beets to a very fine degree, separating the fluent from the non-fluent portions by centrifuging, heating the fluent portion to about two hundred twelve degrees Fahrenheit (212° F.) to coagulate heat-coagulable material therein, homogenizing the liquid containing the resulting coagulum, and subjecting the homogenized mass to a packaging operation.

13. The process of making heat-sterilized, packaged vegetable juice, which comprises comminuting vegetables normally yielding non-acid juice to a very fine degree, centrifuging the resulting mass to separate the fluent from the non-fluent portion thereof, subjecting the separated non-fluent portion to another set of said comminuting and centrifuging steps, heating at least one of said fluent portions to coagulate material therein coagulable by subsequent sterilizing by heat, homogenizing the liquid containing the resulting coagulum, and subjecting the homogenized mass to a packaging operation including said sterilizing by heat.

14. The process of making heat-sterilized, packaged carrot juice which comprises comminuting carrots to a very fine degree, centrifuging the resulting mass to separate the fluent from the non-fluent portion thereof, subjecting the separated non-fluent portion to another set of said comminuting and centrifuging steps, heating at least one of said fluent portions to coagulate material therein coagulable by subsequent sterilizing by heat, homogenizing the liquid containing the resulting coagulum, and subjecting the homogenized mass to a packaging operation including said sterilizing by heat.

15. The process of making heat-sterilized, packaged celery juice which comprises comminuting celery to a very fine degree, centrifuging the resulting mass to separate the fluent from the non-fluent portion thereof, subjecting the separated non-fluent portion to another set of said comminuting and centrifuging steps, heating at least one of said fluent portions to coagulate material therein coagulable by subsequent sterilizing by heat, homogenizing the liquid containing the resulting coagulum, and subjecting the homogenized mass to a packaging operation including said sterilizing by heat.

16. The process of making heat-sterilized, packaged red beet juice which comprises comminuting red beets to a very fine degree, centrifuging the resulting mass to separate the fluent from the non-fluent portion thereof, subjecting the separated non-fluent portion to another set of said comminuting and centrifuging steps, heating at least one of said fluent portions to coagulate material therein coagulable by subsequent sterilizing by heat, homogenizing the liquid containing the resulting coagulum, and subjecting the homogenized mass to a packaging operation including said sterilizing by heat.

17. The process of making heat-sterilized, packaged, vegetable juice, which comprises peeling and comminuting vegetables normally containing non-acid juice to a very fine degree, centrifuging the resulting mass to separate the fluent from the non-fluent portions thereof, subjecting the separated non-fluent portion to another set of said comminuting and centrifuging steps, heating both fluent portions to about two hundred twelve degrees Fahrenheit (212° F.) to coagulate coagulable material therein, homogenizing the liquid containing the resulting coagulum, and subjecting the homogenized mass to a packaging operation including sterilizing by the application of heat.

18. The process of making heat-sterilized, packaged carrot juice which comprises peeling and comminuting carrots to a very fine degree, centrifuging the resulting mass to separate the fluent from the non-fluent portions thereof, subjecting the separated non-fluent portion to another set of said comminuting and centrifuging steps, heating both fluent portions to about two hundred twelve degrees Fahrenheit (212° F.) to coagulate coagulable material therein, homogenizing the liquid containing the resulting coagulum, and subjecting the homogenized mass to a packaging operation including sterilizing by the application of heat.

19. The process of making heat-sterilized, packaged red beet juice which comprises peeling and comminuting red beets to a very fine degree, centrifuging the resulting mass to separate the fluent from the non-fluent portions thereof, subjecting the separated non-fluent portion to another set of said comminuting and centrifuging steps, heating both fluent portions to about two hundred twelve degrees Fahrenheit (212° F.) to coagulate coagulable material therein, homogenizing the liquid containing the resulting coagulum, and subjecting the homogenized mass to a packaging operation including sterilizing by the application of heat.

20. The process of making heat-sterilized, packaged celery juice which comprises comminuting celery to a very fine degree, centrifuging the resulting mass to separate the fluent from the non-fluent portions thereof, subjecting the separated non-fluent portion to another set of said comminuting and centrifuging steps, heating both fluent portions to about two hundred twelve degrees Fahrenheit (212° F.) to coagulate coagulable material therein, homogenizing the liquid containing the resulting coagulum, and subjecting the homogenized mass to a packaging operation including sterilizing by the application of heat.

21. The process of preparing vegetable juice for a heat-treatment which would normally cause coagulation into lumps of a constituent thereof, so as to prevent the presence of lumps in said juice on being subjected to said heat-treatment, without removal of said constituent from said juice, said process being characterized by heat-coagulating substantially all of said constituent and finely dividing and dispersing the resulting coagulum in said juice before subjecting said juice to said heat-treatment.

22. The process of making a heat-sterilized sealed package of vegetable juice which contains material coagulable into lumps by heat-sterilizing, which comprises: extracting from a raw vegetable, juice containing a relatively increased amount of food values by comminuting raw vegetable material to a very fine degree; forcibly separating the resulting fluent from the non-fluent portions to make the solids easily comminutable; comminuting said solids, and forcibly separating the resulting fluent from the non-fluent portions; and packaging, sealing and sterilizing the extracted juice by heating the fluent portions to about two hundred twelve degrees Fahrenheit (212° F.) to coagulate heat-coagulable material therein, homogenizing the fluent portions while containing the resulting coagulated material, and subjecting the combined fluent portions to a packaging and sealing operation including heat-sterilizing.

JOHN G. SOUTHER.